United States Patent
Jorgensen et al.

(10) Patent No.: US 6,278,948 B1
(45) Date of Patent: Aug. 21, 2001

(54) METHOD FOR GRAVITY AND MAGNETIC DATA INVERSION USING VECTOR AND TENSOR DATA

(75) Inventors: Gregory Joseph Jorgensen; Jerry Lee Kisabeth, both of Ponca City, OK (US)

(73) Assignee: Conoco Inc., Houston, TX (US)

( * ) Notice: Subject to any disclaimer, the term of this patent is extended or adjusted under 35 U.S.C. 154(b) by 0 days.

(21) Appl. No.: 09/285,570

(22) Filed: Apr. 2, 1999

(51) Int. Cl.$^7$ ........................................... G01V 1/34
(52) U.S. Cl. ................................. 702/6; 702/14
(58) Field of Search ................... 702/6, 14, 16

(56) References Cited

U.S. PATENT DOCUMENTS

| | | | |
|---|---|---|---|
| 5,675,147 | 10/1997 | Ekstrom et al. | 250/256 |
| 5,678,643 | 10/1997 | Robbins et al. | 175/45 |
| 5,729,451 | 3/1998 | Gibbs et al. | 364/421 |
| 5,889,729 | 3/1999 | Frenkel et al. | 367/73 |
| 6,052,651 | * 4/2000 | Fournier | 702/14 |

OTHER PUBLICATIONS

Yishi, L. et al., "Simultaneous Inversion of Gravimetric and Magnetic Data Constrained With Internal Correspondence Analysis and its Application to the Tarim Basin," *Seismology and Geology*, vol. 18, No. 4, pp 361–68 (Dec. 1996)—Abstract only presented in English.

Xichen, W., "The Research on Generalizeal Joint Inversion Method Used to Inverse Magnetic and Density Interface," Jnl of Changchun University of Earth Science (1990)—Abstract only presented in English.

Rongchang, J., "Normalized Solution of Linear Equation System With Applications," Geophysical Prospecting For Petroleum, vol. 31, No. 2, pp. 38–46 (Jun. 1992)—Abstract only presented in English.

Wen–Cai, Y. et al., "Velocity Imaging From Reflection Seismic Data by Joint Inversion Techniques," Acta Geophysica Sinica, vol. 30, No. 6, pp. 617–627 (Nov. 1987)—Abstract only presented in English.

Zhaoqin, M., "Optimal filtering method for separating off gravity anomalies," OGP, 1997 32(3), pp. 376–386—Abstract only presented in English.

Xiwen, W., "Direct hydrocarbon prediction using joint inversion of gravimetric and seismic data," OGP, 1997, 32(2), pp. 221–228—Abstract only presented in English.

Rui, F. et al., "A Non–Block Consistent Model in Seismo––Gravity Inversion," Acta Geophysica Sinica, vol. 36, No. 4, pp. 463–475 (Jul. 1993)—Abstract only presented in English.

(List continued on next page.)

*Primary Examiner*—Christine Oda
*Assistant Examiner*—Victor J. Taylor
(74) *Attorney, Agent, or Firm*—Madan, Mossman & Sriram

(57) ABSTRACT

A method for modeling geological zones having anomalous density includes determining the top of the anomalous zone from non-potential fields data. Potential fields data is then used to derive the lower boundary of the geologic anomalous zone. A lower boundary to a anomalous zone is formulated by predicting parameters representing the lower boundary within predetermined limits. This is done by using an inversion process on the potential fields data, such as measurements of gravity data, magnetic data. These may be in both vector and tensor form. The potential fields data is compared to the predicted fields from the results of the inversion process to obtain a difference between the two. If the difference exceeds a predetermined value, the parameters representing the anomalous zone are adjusted to improve the fit. When the lower boundary limits are reached or the difference between the model and the data is less than the predetermined value or convergence is attained, the anomalous zone has been determined.

28 Claims, 4 Drawing Sheets

OTHER PUBLICATIONS

Xiaoping, M. et al., "Gravity inversion using weight–smoothed boundary element method," OGP, 1995, 30(4), pp. 523–532—Abstract only presented in English.

Bell, R., Full Tensor Gradiometry: 3–D Tool for the Next Century, pp. 190–193 and drawings (date and publication unknown).

Pratson, L.R. et al., "A High Resolution 3–D Marine Gravity Gradiometry Survey over a Gulf of Mexico Deepwater Subsalt Prospect in the Mississippi Canyon Area," (Apr. 1994)—Abstract.

Egorova, T.P., "Preliminary 3–D Density Model for the Lithosphere of Dneiper–Donets Basin on the Basis of Gravity and Seismic Data," pp. 191–193 (date and publication unknown).

Dransfield, M.H., "Invariments of the Gravity Gradient Tensor for Exploration Geophysics," CRA Exploration, Abstract G–12B–3.

Kaufmann, R. et al., "Joint Tomographic Inversion of Travel–Time Residuals and Gravity Anomalies for Crustal Velocity Structure in Southeast Tennessee," School of Earth and Atmospheric Sciences, Abstract S41A–4.

Mickus, K. et al., "Gravity Gradient Tensor Analysis of the Arkoma Basin and Ouachita Mountains, Ark. And Ok.," Abstract T11B–13.

Bocchio, F., "A <Tidal> Magnetic Field?," Annali Di Geofisica., vol. XL, No. 5, pp. 1029–1032 Oct. 1997).

Zadro, Maria et al., "Spectral methods in gravity inversion: the geopotential field and its derivatives," pp. 1433–1443 (date and publication unknown).

Bocchio, F., "Research Note: on some implications of the Poisson relation," Geophys. J. Int. (1998) 133, 207–08.

Pallium, R. Jay et al., "Seismic theory, inversion and resolution," Seismological Research Letters, vol. 62, No. 1, (Jan.–Mar., 1991), p. 19.

Geophysics, Session 112, Oct. 30, 1996 (CCC:C109) Abstract pp. A–283–284.

Murthy, I.V.R. et al., "Gravity Anomalies of a Vertical Cylinder of Polygonal Cross–Section and Their Inversion," Computers & Geosciences, vol. 22, No. 6 pp. 625–630 (1996).

Zheng, Y. et al., "Joint inversion of gravity and magnetic anomalies of eastern Canada," Can. J. Earth Sci., 35: 832–53 (1998).

Chamot–Rooke N., et al., "Constraints on Moho Depth and Crustal Thickness in the Liguro–Provencal Basin from a 3D Gravity Inversion: Geodynamic Implications," Revue de L'Institut Francais Du Petrole, vol. 52, No. 6 Nov.–Dec. 1997 pp. 557–583.

Association Round Table pp. 1925–1926 (date unknown).

Bowin, C. et al., "Depth estimates from ratios of gravity, geoid, and gravity gradient anomalies," Geophysics, vol. 51, No. 1 (Jan. 1986), pp. 123–136, 12 Figs, 2 Tables.

Hansen, R., "Euler Deconvolution and Its Generalizations," pp. 1–8 (date unknown).

Jacobsen, B., "A case for upward continuation as a standard separation filter for potential–field maps," Geophysics, vol. 52, No. 8 (Aug. 1987), pp. 1138–1148, 10 Figs.

Vasco, D.W., "Groups, algebras, and the non–linearity of geophysical inverse problems," Geophys. J. Int. (1997), 131, pp. 9–23.

Ates, A., et al., "Geophysical investigations of the deep structure of the Aydin–Milas region, southwest Turkey: Evidence for the possible extension of the Hellenic Arc," Isr. J. Earth Sci.: 46: pp. 29–40 (1997).

Doering, J. et al., "Gravity Modeling in the Southern Urals," Abstract, Geophysics/Tectonophysics (Posters) Session 159 (Oct. 1996).

Opfer, R.R., "Synthetic Gravity Modelling—An Interpretation Tool to Integrate Seismic and Gravity Data," P140 EAEG—55$^{th}$ Mtg and Technical Exhibition (Jun. 1993).

Papp, G., "Trend Models in the Least–Squares Prediction of Free–Air Gravity Anomalies," Periodica Polytechnica Ser. Civil. Eng., vol. 37, No. 2, pp. 109–130 (1993).

Sumanovac, F., et al., "System Architecture for 3D Gravity Modelling," Geol. Croat. 49/2 pp. 145–153, 12 Figs. (1996).

Danchiv, D. et al., "Computation of Gravity Gradient Tensor in a Rectangular System of Prisms for Vrancea Zone, Galati–Focsani Alignment," Int'l Geophysical Symposium, p. 99 (date unknown).

Henke, C.H. et al., "Interactive three–dimensional gravity inversion and forward modeling using a visualization system," Hamburg, University, Germany, pp. 430–431 (date unknown).

Anderson, R.N., 1998 Annual Meeting Abstract No. 27, "Future Technologies—A Far–Field Industry Review," AAPG Annual Meeting (May, 1998).

Abdelrahman, E.M. et al., "Depth determination for buried spherical and horizontal cylindrical bodies: an iterative approach using moving average residual gravity anomalies," J. Univ Kuwait (Sci.) 22 pp. 114–121 (1995).

Fairhead, J.D. et al., "Application of Semi–Automated Interpretation Methods in Western Siberia and Southern Sudan," EAEG 56$^{th}$ Meeting and Technical Exhibition, 1037 (Jun. 1994).

Casas, A. et al., "An Interactive 2D and 3D Gravity Modelling Programme for IBM–Compatible Personal Computers," EAGE 58$^{th}$ Conference and Technical Exhibition, P184 (Jun. 1996).

Olesen, Odleiv, "Application of the Potential Field Methods to the Study of the Lofoten–Lopphavet Area, Northern Norway," EAEG 56$^{th}$ Meeting and Technical Exhibition, 1034 (Jun. 1994).

Henke, C.H. et al., "Geomaster—A Programme for Interactive 3D Gravity Inversion and Forward Modelling," EAGE 57$^{th}$ Conference and Technical Exhibition, P145 (Jun. 1995).

Stiopol, D. et al., "Gravity and Magnetics Studies in the Vrancea Zone of Romania," EAGE 58$^{th}$ Conference and Technical Exhibition, M056 (Jun. 1996).

Radhakrishna, M. et al., "Gravity Inversion of Closed Two–Dimensional Bodies," Bollettino Di Geofisica Teorica Ed Applicata, vol. XXXIV, No. 136, pp. 287–296 (Dec. 1992).

Nandi, B.K., et al., "A short note on: Identification of the shape of simple causative sources from gravity data," Geophysical Prospecting, 45, pp. 513–520 (1997).

Silitonga, T.H. et al., "Relation of Reservoir Condition Changes to Precision Gravity Measurement with Contribution 3–D Model in Kamojang Geothermal Field," Proceedings Indonesian Petroleum Association (Oct. 1995).

Schenk, R.L. et al., "Integrated Gravity Modeling of Salt Feature in the Mississippi Salt Basin," Transactions of the Gulf Coast Association of Geological Societies, vol. XLVI (1996).

Abstract Page, EOS, vol. 61, No. 17 (Apr. 1980), p. 300.

Mjelde, R. et al., "Crustal structure of the northern part of the Voring Basin, mid–Norway margin, from wide–angle seismic and gravity data," Tectonophysics 293 (1998) 175–205.

Kilty, K., "Short Note: Werner deconvolution of profile potential field data," Geophysics, vol. 48, No. 2 (Feb. 1983): p. 234–237, 2 Figs, 1 Table.

Coburn, G.W., "Applied Geophysics Report: 3D full tensor gradient method improves subsalt interpretation," Bell Geospace, Inc., (Sep. 1998).

Garcia–Abdeslem, J., "Short note: Gravitational attraction of a rectangular prism with depth–dependent density," Geophysics, vol. 57, No. 3 (Mar. 1992) p. 470–473, 3 Figs.

Guspi, F., "General 2D gravity inversion with density contrast varying with depth," Geoexploration 26 (1990) 253–265.

Dindi, E.W. et al., "Joint three–dimensional Inversion of gravity and magnetic data from Jombo Hill alkaline complex, Kenya," Jnl of Geological Society, vol. 145 (1998) pp. 493–504, 12 Figs. 3 Tables.

Richardson, R.M. et al., "The inversion of Gravity Data into Three–Dimensional Polyhedral Models," Jnl Geophysical Research, vol. 94, No. B6 pp. 7555–7562 (Jun. 1989).

Prutzman, J., "Cold–War Stealth Science Can Aid Seismic Interpretation," JPT, pp. 56–57 (Jan. 1998).

Lines, L.R. et al., "Tutorial A Review of Least–Squares Inversion and its Application to Geophysical Problems," Geophysical Prospecting 32, 159–186 (1984).

Kwok, Y, "Gravity Gradient Tensors Due to a Polyhedron with Polygonal Facets," Geophysical Prospecting 39, 435–443 (1991).

Kwok, Y., "Singularities in gravity computation for vertical cylinders and prisms," Geophys. J. Int. (1991) 104. 1–10.

Montana, C.J. et al., "Program to Calculate the Gravitational Field and Gravity Gradient Tensor Resulting From a System of Right Rectangular Prisms," Computers & Geosciences, vol. 18, No. 5, pp. 587–602 (1992).

Soler, T., "A matrix representation of the potential second-rank gradient tensor for local modelling," Geophys. J.R. astr. Soc. (1985) 81, 363–379.

Hynes, A., "Gravity, flexure,and the deep structure of the Greenville Front, easter Quebec and Labrador," Can. J. Earth Sci., vol. 31 1001–1011 (1994).

Zeyen, H. et al., "3–D joint inversion of magnetic and gravimetric data with a priori information," Geophys. J. Int. (1993) 112, 224–256.

Marino, J. et al., "Gravity and magnetic models of the Midcontinent Rift in eastern Lake Superior," Can. J. Earth Sci. vol. 31 (1994) 661–674.

Thomas, M.D. et al., "An interpretation of gravity anomalies over the Midcontinent Rift, Lake Superior, constrained by GLIMPCE seismic and aeromagnetic data," Can. J. Earth Sci. vol. 31 (1994) 682–697.

Murthy, I.V.R. et al., "Gravity Inversion of Horizontal Circular Discs and Vertical Circular Cylinders," Computers & Geosciences vol. 20 No. 5, pp. 821–838 (1994).

Rao, C.V. et al., "Forward Modeling: Gravity Anomalies of Two–Dimensional Bodies of Arbitrary Shape with Hyperbolic and Parabolic Density Functions," Computers & Geosciences vol. 20 No. 5 pp. 873–880 (1994).

Chai, Y. et al., "Gravity inversion of an interface above which the density contrast varies exponentially with depth," Geophysics, vol. 53, No. 6 (Jun. 1988) p. 837–845, 7 Figs. 1 Table.

Hammer, P.T.C. et al., "Gravity inversion using seminorm minimization: Density modeling of Jasper Seamount," Geophysics, vol. 56, No. 1 (Jan. 1991) p. 68–79, 7 Figs.

Holstein, H. et al., "Gravimetric analysis of uniform polyhedra," Geophysics, vol. 61, No. 2 (Mar.–Apr. 1996) p. 357–364, 6 Figs., 5 Tables.

Lee, T. et al., "Inversion modeling of gravity with prismatic mass bodies," Geophysics, vol. 56, No. 9 (Sep. 1991), p. 1365–1376, 7 Figs.

Nekut, A.G., "Borehole gravity gradiometry," Geophysics, vol. 54, No. 2 (Feb. 1989) p. 225–234, 12 Figs.

Pedersen, L.B. et al., "The gradient tensor of potential field anomalies: Some implications on data collection and data processing of maps," Geophysics, vol. 55, No. 12 (Dec. 1990) p. 1558–1566, 6 Figs.

Vasco, D.W. et al., "Inversion of airborne gravity gradient data, southwestern Oklahoma," Geophysics, vol. 56, No. 1 (Jan. 1991) p. 90–101, 9 Figs., 1 Table.

Rummel, R. et al., "Spectral analysis of the full gravity tensor," Geophys. J. Int. (1992) 111, 159–169.

Holliger, K. et al., "A comparison of the Moho interpreted from gravity data and from deep seismic reflection data in the northern North Sea," Geophysical Jnl (1989) 97 pp. 247–258.

Guspi, F., "Short Note: Three–dimensional Fourier gravity inversion with arbitrary density contrast," Geophysics, vol. 57, No. 1 (Jan. 1992) p. 131–135, 4 Figs.

Bulakh, E.G. et al., "Singularity Criteria for Solution of Inverse Gravimetry Problem by the Selection Method," Gaffes. J. 1995, vol. 15, pp. 173–187.

Bulakh, E.G. et al., "Direct and Inverse Gravimetric Problems for a Class of Bodies Approximated by Horizontal Plates," Geophys. J., 1995, vol. 14, pp. 315–330.

Cassano, E. et al., "Gravity and Magnetic Methods in Crustal Exploration," Potential of Deep Seismic Profiling for Hydrocarbon Exploration, Paris 1990, pp. 95–104.

Ceron, F.A. et al., "A Non Linear Iterative Method for the Inversion of Potential Field Data," Rev. Inst. Mex. Petrol., vol. XXIII, No. 3, pp. 22–36 (Jul. 1991)—Abstract only presented in English.

* cited by examiner

METHOD FOR GRAVITY AND MAGNETIC DATA INVERSION USING VECTOR AND TENSOR DATA

BACKGROUND OF THE INVENTION

1. Field of the Invention

The present invention pertains to processing gravity and magnetic data using vector and tensor data and more particularly to the inversion of gravity and magnetic data to locate possible hydrocarbon bearing zones near anomalies such as salt, igneous or magmatic formations.

2. Related Prior Art

Exploration for hydrocarbons in subsurface environments containing anomalous density variations has always presented problems for traditional seismic imaging techniques by concealing geologic structures beneath zones of anomalous density. The density by itself does not cause problems with seismic methods, but usually, large density contrasts are also associated with large velocity contrasts: this can cause severe ray-bending and problems with seismic processing. In this application, wherever reference is made to anomalous density, it is to be assumed that anomalous velocity is also present. Many methods for delineating the extent of the anomalous density zones exist.

U.S. Pat. No. 4,987,561, titled "Seismic Imaging of Steeply Dipping Geologic Interfaces," issued to David W. Bell, provides an excellent method for determining the side boundary of an anomalous density zone. This patent locates and identifies steeply dipping rock interfaces from seismic reflection data by first identifying select data that has characteristics indicating that the acoustic pulses that it represents have been reflected from a substantially horizontal or steeply dipping interface. This data is analyzed and processed to locate the steeply dipping interface. The processed data is displayed to illustrate the location and dip of the interface. This patent, while helping locate the boundaries, provides nothing to identify the subsurface formations on both sides of the boundary.

There have also been methods for identifying subsurface formations beneath anomalous zones using only seismic data to create a model and processing the data to identify formations in light of the model. By further processing acoustic seismic data, the original model is modified or adjusted to more closely approximate reality.

An example of further processing seismic data to improve a model is U.S. Pat. No. 4,964,103, titled "Three Dimensional Before Stack Depth Migration of Two Dimensional or Three Dimensional Data," issued to James H. Johnson. This patent provides a method of creating a three-dimensional model from two dimensional seismic data. This is done by providing a method of ray tracing to move before stack trace segments to their approximate three-dimensional position. The trace segments are scaled to depth, binned, stacked and compared to the seismic model. The model can then be changed to match the depth trace segments which will be stacked better, moved closer to their correct three-dimensional position and will compare better to the model. This patent uses a rather extensive seismic process to modify a seismic model that is not accurate. Seismic inversion schemes of the type disclosed in the Johnson patent can be quite accurate provided there is a good starting model for the velocity variations in the subsurface. This is hard to obtain in structurally complex areas, and for this reason, seismic inversion techniques used by themselves have a spotty record in geologically complex areas.

One type of geologic exploration data that has not been used extensively in the past is potential fields data, such as gravity and magnetic data, both vector and tensor data. Gravity gradiometry has been in existence for many years although the more sophisticated versions have been held as military secret until recently. The use of gravity data became acceptable in the late eighteen hundreds when measuring instruments with greater sensitivity were developed. Prior to this time, while gravity could be measured, variations in gravity caused by the effect of a large nearby object at one location, the gravity gradient and the gravity tensor, could not be reliably measured. The term gravity refers to a measurement of the earth's gravitational field g, the term gravity vector refers to the components of the gravitational field $g_x$, $g_y$ and $g_z$, while the term gravity tensor refers to the matrix of derivatives of the gravitational vector. This tensor has five independent components due to symmetry considerations. Similar meanings exist for the magnetic field, the magnetic field vector and the magnetic field tensor.

It has been known since the time of Sir Isaac Newton that bodies having mass exert a force on each other. The measurement of this force can identify large objects having a change in density even though the object is buried beneath the earth's surface or in other ways out of sight.

Exploration for hydrocarbons in subsurface environments containing anomalous density variations such as salt and evaporite formations, shale diapers, highly pressured sediments, and extrusive and intrusive igneous bodies create havoc on seismic imaging techniques by concealing geologic structures beneath zones of anomalous density and velocity. Such bodies, in addition to abnormal densities relative to the sediments in proximity, also have abnormal values of magnetic susceptibility. By utilizing gravity and/or magnetic field measurements along with a robust inversion process, these anomalous density zones can be modeled. The spatial resolution obtained from this process is normally much lower resolution than that obtained from acoustic seismic data. However, models obtained from gravity and magnetic data can provide a more accurate starting model. Using the potential methods data models as a starting point for two dimensional and three-dimensional seismic depth imaging greatly enhances the probability of mapping concealed geologic structures beneath the zones of anomalous density. The present invention increases the accuracy and resolution of gravity mapping by the use of seismic or other kinds of data to provide a good starting model for density variations above the anomalous regions.

SUMMARY OF THE INVENTION

The present invention entails the development of a very robust inversion process to produce models based on vector and tensor potential methods data (both gravity and magnetics). These data combined with seismically imaged portions of the structures as well as a three-dimensional density model are input in the inversion process to image the overall anomalous formations. For example, in the case of salt formations in the Gulf of Mexico, a top of a salt map derived from seismic imaging along with a density model and bathymetry, are utilized to produce a base of salt model from the inversion process.

The present invention provides a method for determining parameters representing an anomalous subterranean formation. One or more components of potential fields vector and tensor data are measured at a plurality of locations over a region including the anomalous formation. The potential fields may be either gravity fields or magnetic fields, vector and/or tensor. A geophysical model of the region including the anomalous formation is determined. A value of the one or more components of the potential fields vector and tensor data at the plurality of locations is estimated for the model. A difference between the estimated values and the measured values at the plurality of locations is determined. The model of the region is updated based on the difference. The estimate of the value of the one or more components, the determination of the difference and the updating of the model is repeated until the difference reaches a minimum value. The updated model is used to determine the parameter of interest. The method is equally applicable to combined gravity and magnetic data.

In the method of the present invention the parameter subterranean formation may be selected from the group consisting of a salt body, a shale diapir, and extrusive or intrusive igneous bodies.

DESCRIPTION OF THE PREFERRED EMBODIMENT

Figure 1:
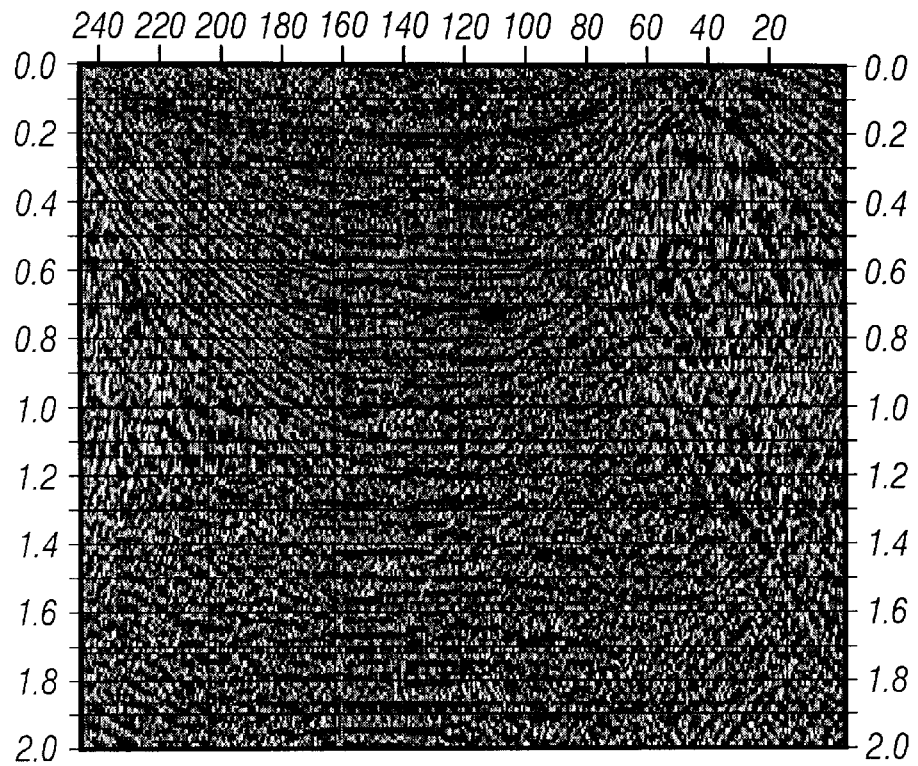
FIG. 1 is a seismic section of an area having an anomalous density zone such as a salt dome.

The present invention utilizes a very robust formulation for calculating vector and tensor components of gravity and magnetic fields due to a parameterized model such as salt formations embedded in a known or assumed distribution of sediments. The embedded model is composed of an upper boundary, usually mapped with seismic methods, and a parameterized lower boundary to be determined by an inversion process. This formulation makes it possible to build an inversion process to determine the lower boundary parameters so as to minimize the difference between any or all of the model fields mentioned above and their measured counterparts. Since this inversion process is so robust and applicable to so many varied field measurements, it can be used for exploration at both regional and prospect scales.

The inversion process of the present invention demonstrates its strength in several areas. In the area or background sediment properties, the density and susceptibility can have any horizontal variability including discontinuities. The depth variation of these properties is assumed to be a polynomial up to order six for density and order five for susceptibility. Thus, for practical purposes, there are no apparent restrictions on the variability of density and susceptibility especially considering the inherent resolution of gravity and magnetic analyses.

For three-dimensional inversion, the forward model fields and associated sensitivity matrix components, (partial derivatives of the model fields with respect to the parameters representing the lower boundary), used in the inversion process can be calculated simultaneously in a two dimensional integration routine. This fact makes the three-dimensional inversion tractable.

For two dimensional inversions, the problem can be reduced to a one dimensional integration routine allowing inversion steps to be done extremely rapidly. This inversion is used to model single profiles of field data. The 2.5 and 2.75 inversions are also applied to single profiles of data. However, rather than assuming the model to be infinitely extended on both sides of the profile, the 2.5-D model has finite but equal extensions on both sides of the profile, whereas the 2.75-D model has unequal extensions. Both types of inversions can be processed very rapidly by utilizing the three-dimensional framework. Furthermore, this allows off profile variations of the model to be entertained by either determining them in the inversion process or by setting them a priori based on seismic and/or other available information.

Computations based on parallel computing techniques are disclosed only for the three-dimensional case since the 2-dimensional, 2.5-dimensional and 2.75-dimensional inversions are already computationally fast. It turns out that the way the inversion process is setup, it is ideal for using multiple processors. Thus, the elapsed time previously required for large three-dimensional inversion processes can be greatly reduced. This is especially important for regional studies where large data sets are required.

For data preparation, the forward modeling portion of this inversion software is also used to correct the gravity, magnetic and tensor data for complex bathymetric effects. Bouguer corrections are made assuming a depth dependant density as discussed in background sediment properties in order to obtain better input gravity and tensor data for the inversion process. This represents a substantial improvement over the standard use of a constant Bouguer density. In an alternate embodiment of the invention, a constant Bouguer density correction is applied.

Those versed in the art would recognize that numerous corrections are applied to magnetic data measurements to get a better representation of the magnetic field. These include a diurnal correction to correct for magnetic field variations during the day, an International Geomagnetic Reference Field (IGRF) correction, a leveling correction to resolve misties between data acquired at different times. The present method works equally well whether or not a reduction to pole correction is made: such a correction corrects for the effect of an anomalous body depending upon its position with respect to the magnetic poles of the earth.

Some of the major problems confronting the application of any modeling technique applied to potential field data is the removal of the regional field and, thus, the isolation of the field believed to be associated with the scale of the model being examined. By properly filtering the data between successive iterations in the inversion process, determined regional fields can be obtained for the gravity and magnetic data sets simultaneously, thus allowing convergence to a common model structure that explains both the gravity and magnetic fields. The resulting regional fields then can be modeled to determine deep seated structures beneath the area of immediate interest.

All tests of this invention have utilized basis functions equivalent to those used in half cosine transforms for parameterizing the lower boundary in the inversion code. However, it should be emphasized that essentially any orthogonal set of basis functions can be substituted with minimal effort. For example, it may be found that a power series or Legendre polynomials may provide better convergence in the inverse process.

A very important property of this invention is that the observation positions can be distributed arbitrarily, thus removing the need to have the data in a gridded form on the same datum. This is especially important when inverting on data sets from various acquisition sources simultaneously. Also, individual field observations can be weighted in the inversion process according to their uncertainty.

FIG. 1 is a seismic section illustrating an area of interest having a anomalous density zone such as a salt dome. A rounded interface can be seen as masking the formations below. In this example, there exists three rounded formations, all of which mask the formations below. For this seismogram, the lower boundary can not be determined by normal seismic data processing methods.

Figure 2:
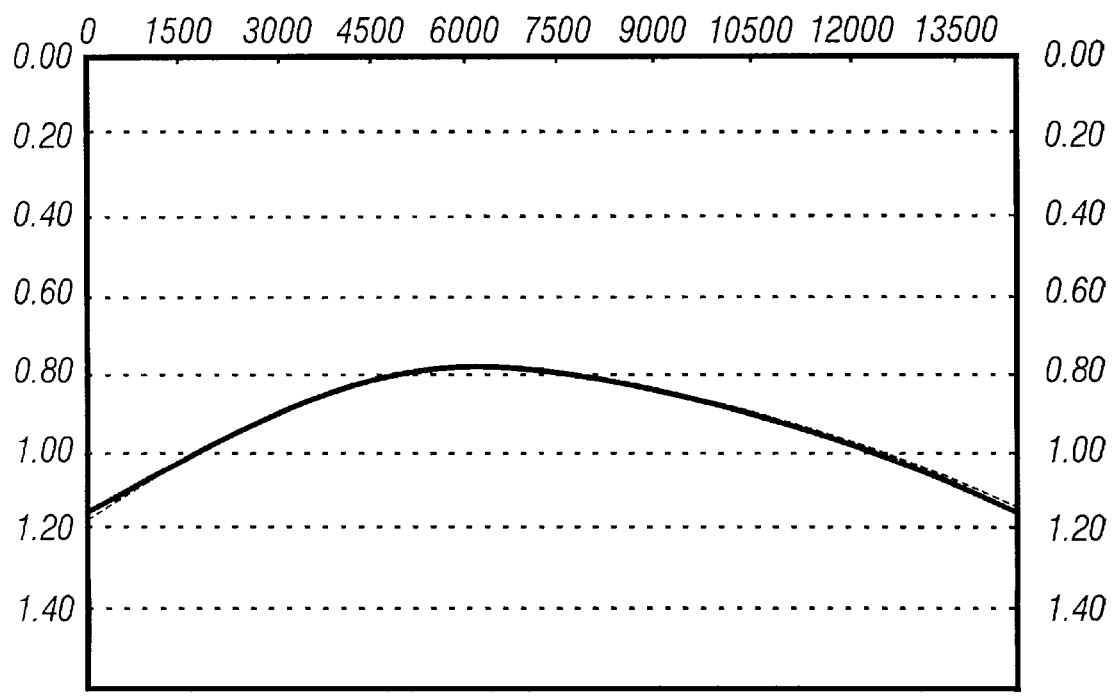
FIG. 2 is a comparison of calculated time event values with picked events from the seismic section of FIG. 1

FIG. 2 illustrates the comparison of calculated time events based solely on seismic data. The small crosses represent the calculated time event values at various points. The solid line represents the selected top boundary from the seismic section of FIG. 1.

Figure 3:
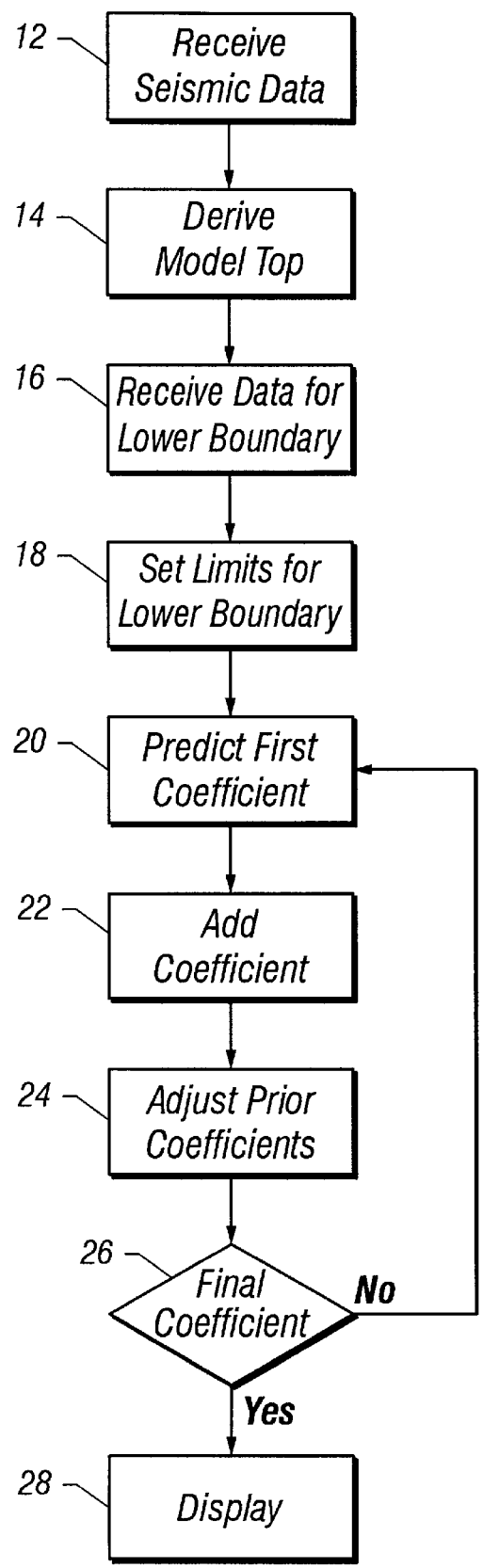
FIG. 3 is a flow chart of a method for modeling geological structures beneath anomalous density zones.

Referring now to FIG. 3, a flow chart illustrating a method for providing a model upon which derivation of subsurface formations can be based. At block 12 acoustic seismic data is received. In general, acoustic seismic data is more reliable than other forms of geologic exploration data in most situations because of the extensive work and research that has been devoted to its use and application.

At block 14, the acoustic seismic data is used to derive the top of a geologic model. As stated previously, acoustic seismic data is very reliable, at least in this situation, for determining the top of the model containing anomalous density zones. The top of the model can be accurately plotted using acoustic seismic data. The bottom of the model can not be so easily done. While acoustic seismic data is generally more reliable than other forms of geological surveying, anomalous density zones, such as a salt body, block or severely distort reflection information. In this type of area acoustic seismic surveying becomes unreliable, which is what occurs in this example. In some cases, the acoustic seismic data becomes so unreliable that no information at all below the salt body can be obtained from acoustic seismic exploration.

Those versed in the art would recognize that the seismic velocity information required for the initial model may be obtained by many methods, including conventional Normal Moveout (NMO) velocity analysis, by prestack or post-stack seismic inversion, or seismic tomography. When combined with known relations between velocity and density for sedimentary rocks, such as given by the Gardner or Gardner and Gregory relationships or a local fit of data using sonic and density logs to the basic form of the relationships, an initial density estimate for the model may be obtained. Alternatively, the density information may be obtained from regional compaction models. All of these techniques would be known to those versed in the art and are not discussed here.

These same sources of data, i.e., seismic, well logs, or regional compaction curves, are also used to determine an initial model for the magnetic susceptibility of the sedimentary section.

At block 16 data pertaining to the determination of the lower boundary is received. These data may of any potential fields data, both vector and tensor. In the formulation used, the type of data is of no concern since any combination of the above mentioned data can be processed simultaneously. Although these types of data are generally not as reliable as acoustic seismic data, for the present application of an anomalous density zone, these types of data provide the most reliable starting point.

The data received is used to formulate the limits of the lower boundary for the geologic model for the area of interest at block 18. The actual formation of the lower boundary is done by determining parameters representing the lower boundary through an inversion process.

Although various inversion techniques can be utilized to determine the parameters (coefficients) representing the lower boundary, the particular one tested in the present invention involves the subsequent inversion of a single coefficient at a time until all coefficients are determined. The total number of coefficients is set a priori at block 18 based upon the minimum wavelength (maximum frequency) desired in the lower boundary. Typical lower boundaries will contain as many as nine hundred coefficients for three-dimensional models, thirty in each horizontal direction. For example, if $x_1$ and $x_2$ are the spatial limits of integration in the x direction and $y_1$ and $y_2$ are the spatial limits of integration in the y direction, and half cosine series are used, the number of terms required in the x and y directions respectively for a minimum wavelength of $\lambda_{min}$ are:

$$n_x = \frac{2(x_2 - x_1)}{\lambda_{min}} + 1 \tag{1}$$

and $$n_y = \frac{2(y_2 - y_1)}{\lambda_{min}} + 1 \tag{2}$$

Thus the total number of coefficients representing the lower boundary is $n_x$ times $n_y$. At block 20, the first coefficient representing a uniform lower boundary (longest wavelength component) is determined. This coefficient is based on the received data and represents the best fit possible with limited information.

At block 22 another coefficient is added through the inversion process. At block 24 all coefficients added thus far are readjusted through single parameter inversion in the order in which they were added to the lower boundary (from the longest to the shortest wavelength coefficients). This process continues until all coefficients ($n_x$ times $n_y$) have been determined. At decision block 26 a determination is made as to whether all coefficients have been determined. If they have not, the program returns to block 22 where another coefficient is added.

A check is also made to see if there are any wavelengths in the updated model that have wavelengths approaching those that were filtered in the initial processing of the data. If so, then the inversion process is restarted with a less severe filtering of long wavelengths.

If all coefficients have been determined, the program proceeds to block 28 where the lower boundary is displayed. This display may take any form currently in use in the art, such as a monitor display, a hard copy printout or be kept electronically on tape or disc.

The numerical integrations necessary for each step of the overall inversion process are accomplished using a two-dimensional Gaussian quadrature for the two horizontal variables while the vertical integration is usually done analytically. Any or all of the components of the potential methods fields vectors and tensors, along with their respective partial derivatives (with respect to each of the coefficients associated with the lower boundary) are integrated simultaneously for each observation, thus saving substantial computer time. Furthermore, between each inversion for estimating a given coefficient an updated integration mask is produced to restrict the integration to the anomalous density region of the model. Another mask (not shown) is utilized for each observation point to limit the horizontal extent of the integration in order to further conserve computer time. This is especially important since as many as one hundred thousand numerical integrations per observation point per component are performed using is of the order of one hundred thousand Gaussian nodes. Thus, for typical exploration applications, billions of integrations are necessary.

In the present invention, the model and the inversion process allow for a fixed density, a laterally varying density, and a vertically varying density or any combination thereof within the anomalous region. Similarly, the model and the inversion process allow for a fixed magnetic susceptibility, a laterally varying magnetic susceptibility, and a vertically varying magnetic susceptibility or any combination thereof within the anomalous region.

For Gaussian integration the integral is broken up into k intervals and apply the two point Gaussian quadrature to each interval.

For example, the jth interval is:

$$\int_{a_f}^{b_f} f(x)d(x) = \frac{(b_k - a_k)}{2} \sum_{i=1}^{i=2} w_f f(x_i) \quad (3)$$

where
$w_i = 1.0$, and $$x_i = \frac{(b_k - a_k)}{2} x'_i + \frac{(b_k + a_k)}{2} \quad (4)$$

with $x_1'$ being simply:

$$x'_1 = -x'_2 = -\frac{1}{\sqrt{3}}$$

Thus, the total integral is $$I = \sum_{k=1}^{k=K} \int_{a_k}^{b_k} f(x)d(x) \quad (4)$$

This is easily extended to two dimensions as follows:

$$I = \sum_{k=1}^{k=K} \sum_{l=1}^{l=L} \int_{a_k}^{b_k} \int_{a_l}^{b_l} f(x,y)dxdy \quad (5)$$

where $$\int_{a_k}^{b_k} \int_{a_l}^{b_l} f(x,y)dxdy = \frac{(b_k - a_k)(b_l - a_l)}{4} \sum_{i=1}^{2} \sum_{j=1}^{2} w_i w_h f(x_i, y_j) \quad (6)$$

with $w_1 = w_j = 1.0$, and as before, $$x_i = \frac{(b_k - a_k)}{2} x'_i + \frac{(b_k + a_k)}{2}$$

$$y_j = \frac{(b_l - a_l)}{2} y'_j + \frac{(b_l + a_l)}{2}$$

where $x_i = y_j'$, and $x_2' = x_1 = 1/\sqrt{3}$.

Thus, the entire integration process is controlled by determining the number of intervals K and L that are used to represent the overall integration limits of x and y and, therefore the values for the $a_k$, $b_k$, $a_l$ and $b_2$.

Figure 4:
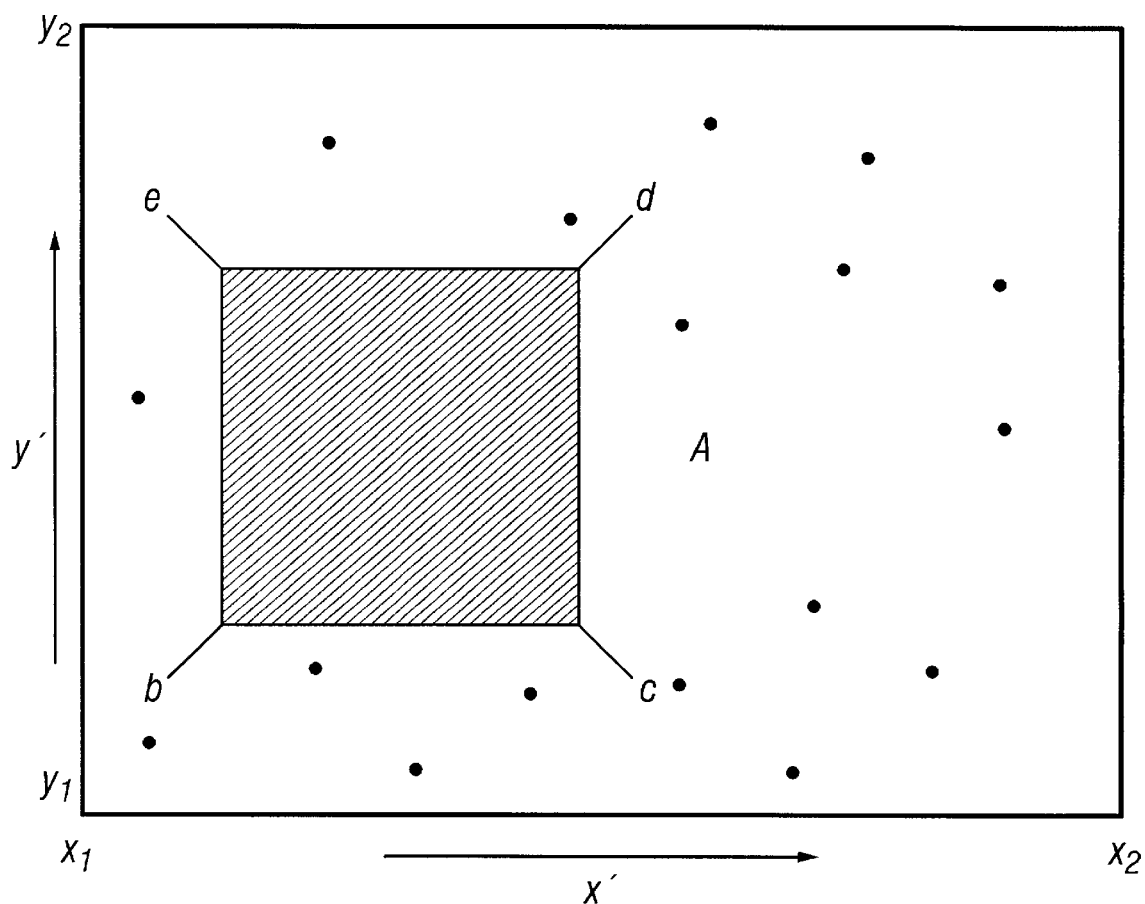
FIG. 4 is a graphical representation of the overall model integration illustrating a chosen window and observation points.

Referring now to FIG. 4, the overall model integration is illustrated. The overall integration is $x_1 \rightarrow x_2$ and $y_1 \rightarrow y_2$. As illustrated, each observation point A can have a chosen window of integration bcde that is equal to or smaller than the model integration window.

The model window of integration is broken up into K times L, a two by two Gaussian quadrature. The dimensions are given by $$\frac{(X_2 - X_1)}{K}$$

units by $$\frac{(Y_2 - Y_1)}{L}$$

units

Thus, the interval for the Gaussian points $x_i$ and $y_i$ will be approximately one half of these respectively.

All information about the distribution of the Gaussian points is calculated prior to the actual calculation along with which Gaussian points have to be utilized for model integration at each observation point. This helps make the problem of doing inversion in the spatial domain tractable.

Figure 5:
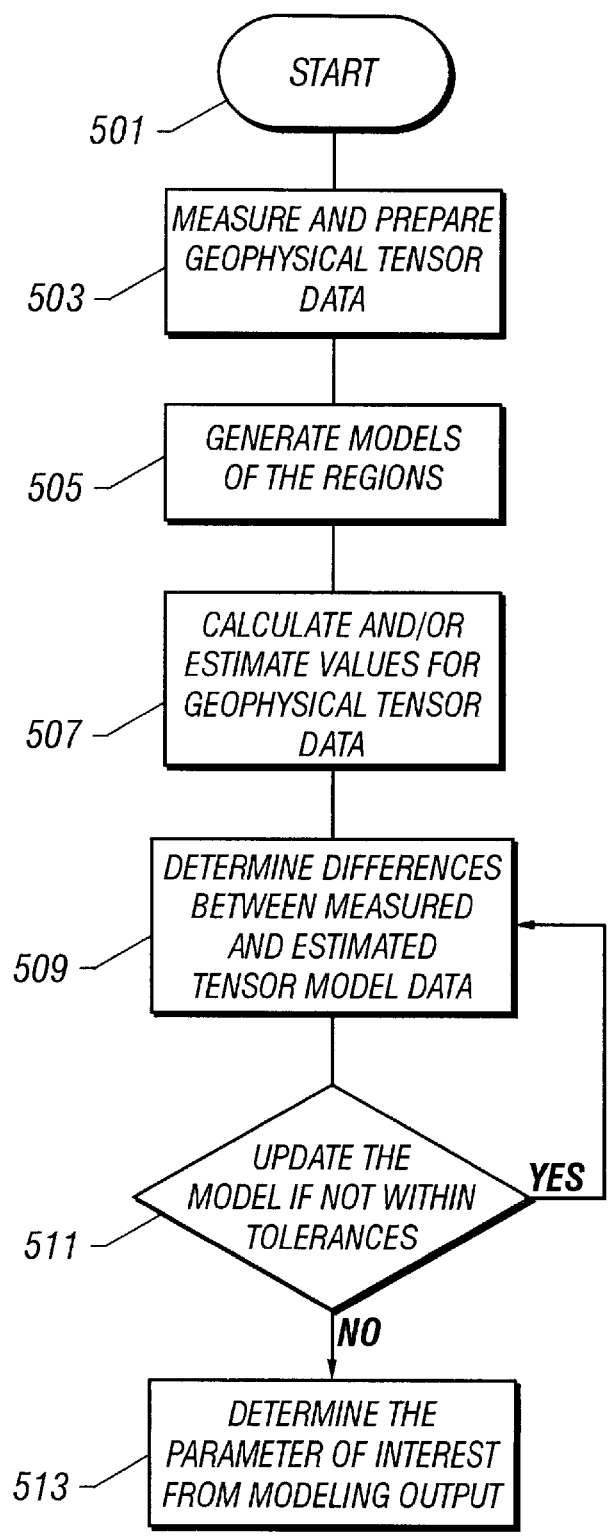
FIG. 5 is a flow chart of a method for determining a parameter of interest from the modeling.

Referring now to FIG. 5, a flow chart illustrating a method for providing a model upon which derivation of parameters of interest may be based. At block 501 the method may be started. Geophysical tensor field data are measured 503 for to used for model generation. The data may be prepared as discussed above for model generation. The model is generated 505 with geophysical tensor and vector data as disclosed above in the discussion for FIG. 3. Tensor data values are estimated from the model. The measured data are compared 509 to the expected value from the model output to determine the differences. The model generated in 505 is updated 511 if the differences from 509 are not within predetermined value tolerances. When the tolerances are found acceptable the parameter of interest is determined 513 from the modeling output.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method for determining a parameter of interest of an anomalous subterranean formation comprising:

(a) measuring at least one component of geophysical tensor data at a plurality of locations over a region including the anomalous formation, said geophysical tensor data selected from magnetic data and gravity data;

(b) determining a geophysical model of the region including the anomalous formation;

(c) for said model, estimating a value of said at least one component of geophysical tensor data at said plurality of locations;

(d) determining a difference between said estimated value and said measured value of said measurements at said plurality of locations;

(e) updating the model of the region based on said difference;

(f) iteratively repeating steps c–e until said difference is less than a predetermined value; and (g) using said updated model to determine the parameter of interest.

2. The method of claim 1 wherein the subterranean formation is selected from the group consisting of a salt body, a shale diapir, a volcanic flow, an intrusive igneous body, and an extrusive igneous body.

3. The method of claim 1 wherein the at least one component of geophysical tensor data further comprises at least one component of magnetic tensor data and one component of gravity tensor data.

4. The method of claim 1 wherein the parameter of interest is selected from (i) a lower boundary of the anomalous subterranean formation, (ii) a thickness of the anomalous subterranean formation, (iii) a density of the anomalous subterranean formation, (iv) a magnetic susceptibility of the anomalous subterranean formation, and (v) a volume of the the anomalous subterranean formation.

5. The method of claim 1 wherein the at least one component of geophysical tensor data is a gravity component, the method further comprising applying to the at least one component of the geophysical tensor data for at least one of (i) a latitude correction, (ii) a free air correction, (iii) a fixed density Bouguer correction, (iv) a variable density Bouguer correction, (v) Eotvos correction, and (vi) datum correction.

6. The method of claim 1 wherein the at least one component of geophysical tensor data is a magnetic component, the method further comprising applying to the at least one component of the geophysical tensor data for at least one of (i) diurnal correction, (ii) IGRF correction, (iii) leveling correction, (iv) bathymetric correction, (v) fixed magnetic susceptibility correction, and (vi) variable magnetic susceptibility correction.

7. The method of claim 1 wherein the model is selected from (i) a 2D model, (ii) a 2.5D model, (iii) a 2.75D model, and (v) a 3-D model.

8. The method of claim 1 further comprising incorporating in the model one of (i) land topography, and (ii) marine sea surface and water bottom bathymetry.

9. The method of claim 1 wherein the determined geophysical model includes a density for a portion of the region outside the anomalous formation expressed as a polynomial function of depth and a laterally varying density.

10. The method of claim 9 wherein the density is based upon at least one of (i) well log information, (ii) seismic velocity information, (iii) seismic tomography, (iv) prestack seismic inversion of seismic data, (v) post-stack seismic inversion of seismic data, and (vi) regional compaction curves.

11. The method of claim 1 wherein the density of the anomalous formation in the determined geophysical model is at least one of (i) a fixed density, (ii) a laterally varying density, and (iii) a vertically varying density.

12. The method of claim 1 wherein the determined geophysical model includes a magnetic susceptibility for a portion of the region outside the anomalous formation expressed as a polynomial function of depth and a laterally varying susceptibility.

13. The method of claim 1 wherein the determined geophysical model includes a magnetic susceptibility for the anomalous formation selected that is at least one of (i) a fixed susceptibility, (ii) a laterally varying susceptibility, and (iii) a vertically varying susceptibility.

14. The method of claim 1 wherein the determined geophysical model includes a base of the anomalous formation that is at great depth.

15. The method of claim 1 further comprising subtracting a long-wavelength field from the measured data.

16. The method of claim 1 wherein a base of the anomalous formation in the determined geophysical model is expressed in terms of an ordered set of basis functions.

17. The method of claim 16 wherein the set of basis functions are selected from (i) half cosine functions, (ii) Legendre polynomials, and (iii) polynomials.

18. The method of claim 16 the base of the anomalous formation is not allowed to extend beyond a top of the anomalous formation.

19. The method of claim 16 wherein iteratively repeating steps (c)–(e) further comprises solving for a higher basis function after solving for a lower basis function.

20. The method of claim 16 wherein after each iteration low frequency components are filtered out.

21. The method of claim 1 wherein iteratively repeating steps (c)–(e) further comprises an integration of the determined or updated geophysical model.

22. The method of claim 21 wherein the integration of the determined or updated geophysical model is carried out by a set of parallel computations.

23. A method for determining the boundaries of an anomalous geological structure, the method comprising:
（a) receiving a set of non-potential field data;
(b) determining an upper boundary of the anomalous structure using said non- potential field data;
(c) receiving potential field data indicative of a lower boundary of said anomalous structure;
(d) modeling the lower boundary as a weighted sum of a plurality of basis functions to give a model of the lower;
(e) obtaining a set of expected potential field data from the model of the lower boundary;
(f) determining a plurality of weights for said plurality of basis functions by iteratively adding one basis function at a time based on said received potential field data; and
(g) determining the lower boundary of the geological structure from the determined weights and the basis functions.

24. The method according to claim 23 wherein the determining the weights for said plurality of basis functions further comprises:
(i) comparing said received potential field data to said expected potential field data to obtain difference data between said received potential field data and said expected potential field data; and
(ii) modifying the plurality of weights base upon said difference data.

25. The method according to claim 24 wherein said modifying the plurality of weights includes an inversion of said potential field data.

26. The method according to claim 24 wherein ends of said upper boundary are masked.

27. The method according to claim 24 wherein said using said potential fields data includes using at least one of vector magnetic data, vector gravity data, tensor magnetic data and tensor gravity data.

28. A method for determining a parameter of interest of an anomalous subterranean formation comprising:
(a) measuring at least one component of geophysical vector data at a plurality of locations over a region including the anomalous formation, said geophysical vector data selected from magnetic data and gravity data;

(b) determining a geophysical model of the region including the anomalous formation;
(c) for said model, estimating a value of said at least one component of geophysical vector data at said plurality of locations;
(d) determining a difference between said estimated value and said measured value of said measurements at said plurality of locations;
(e) updating the model of the region based on said difference;
(f) iteratively repeating steps c–e until said difference is less than a predetermined value; and
(g) using said updated model to determine the parameter of interest.

* * * * *